United States Patent [19]

Krongauz et al.

[11] Patent Number: 5,412,843
[45] Date of Patent: May 9, 1995

[54] HINGE CONNECTOR

[75] Inventors: Viktor Krongauz, Oak Forest; Gregg E. Dohm, Richton Park; Gulzar A. Qureshi, Tinley Park, all of Ill.

[73] Assignee: Allied Tube & Conduit Corporation, Harvey, Ill.

[21] Appl. No.: 88,752

[22] Filed: Jul. 8, 1993

[51] Int. Cl.⁶ .................. E05D 15/40; E05D 5/02
[52] U.S. Cl. .......................... 16/387; 52/713; 248/300; 403/75; 403/335
[58] Field of Search ............... 16/392, 239, 221, 329; 403/75, 271, 335, 336; 248/300; 52/167 CB, 713

[56] References Cited

U.S. PATENT DOCUMENTS

| | | | |
|---|---|---|---|
| 629,185 | 7/1899 | Arnold | 16/387 |
| 1,159,529 | 11/1915 | Parizek | 16/329 |
| 1,169,274 | 1/1916 | Miller | 16/392 |
| 1,649,586 | 11/1927 | Habart . | |
| 2,053,344 | 9/1936 | Lustig | 29/11 |
| 2,160,808 | 6/1939 | Bradley | 280/106 |
| 2,527,479 | 10/1950 | Hall | 287/101 |
| 2,973,547 | 3/1961 | Heyer | 16/392 |
| 3,131,422 | 5/1964 | Agius | 16/392 |
| 3,326,503 | 6/1967 | Bade | 248/300 |
| 3,493,202 | 2/1970 | Jensen | 248/300 |
| 4,065,218 | 12/1977 | Biggane | 403/71 |
| 4,283,811 | 8/1981 | George | 16/128 |
| 4,409,765 | 10/1983 | Pall | 52/167 |

OTHER PUBLICATIONS

Product Engineering, vol. 31; No. 39; Sep. 19, 1960 p. 89; FIG. 7.
B-Line Strut Systems Engineering Catalog (cover page, pp. 50 and 61).

Primary Examiner—Lowell A. Larson
Assistant Examiner—Donald M. Gurley
Attorney, Agent, or Firm—Allegretti & Witcoff, Ltd.

[57] ABSTRACT

A hinged connector for joining a first structural member to a second structural member in a support structure, comprising first and second metal connector members each having a base portion for attachment to a respective structural member and a tab integral with the base portion. Each base portion includes an integral upset gusset welded to the tab of the respective connector member to add support to the tab and add stiffness to the connector member.

17 Claims, 3 Drawing Sheets

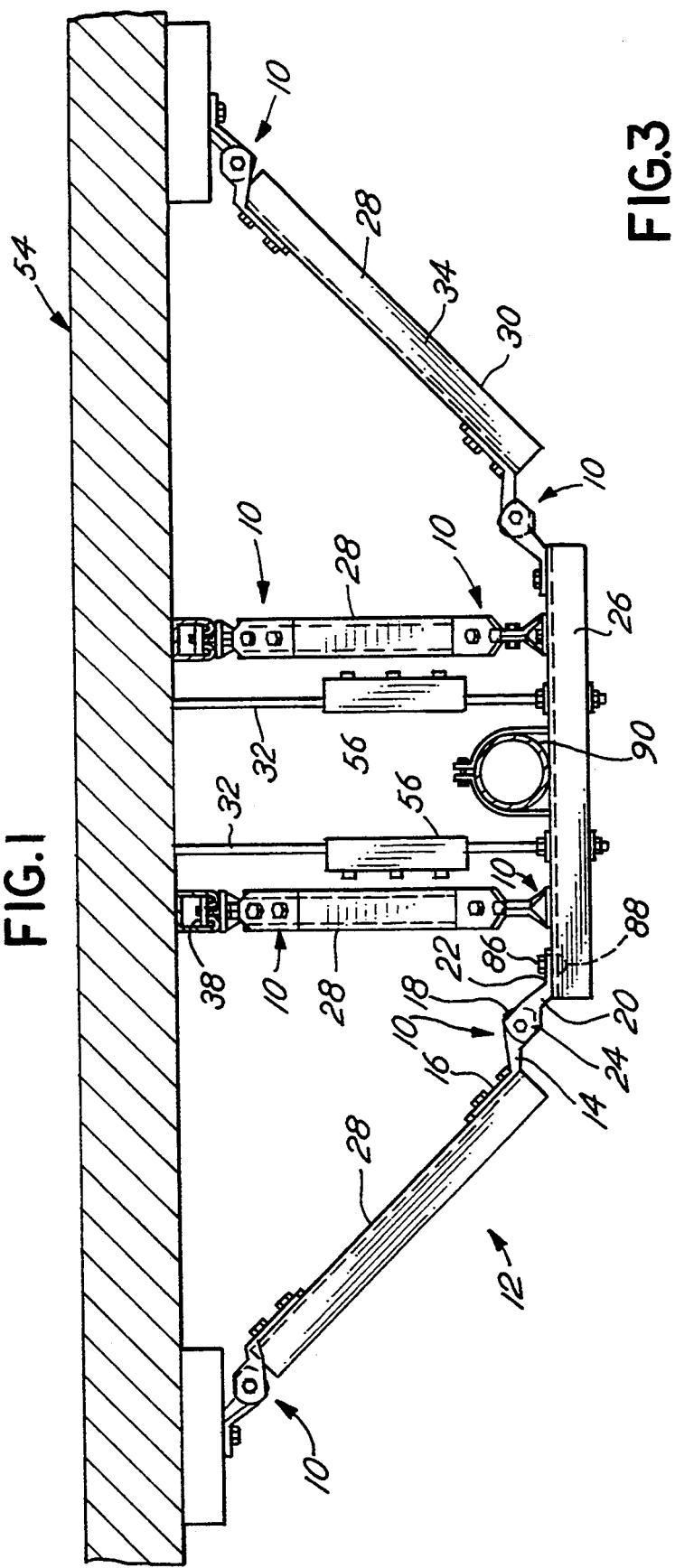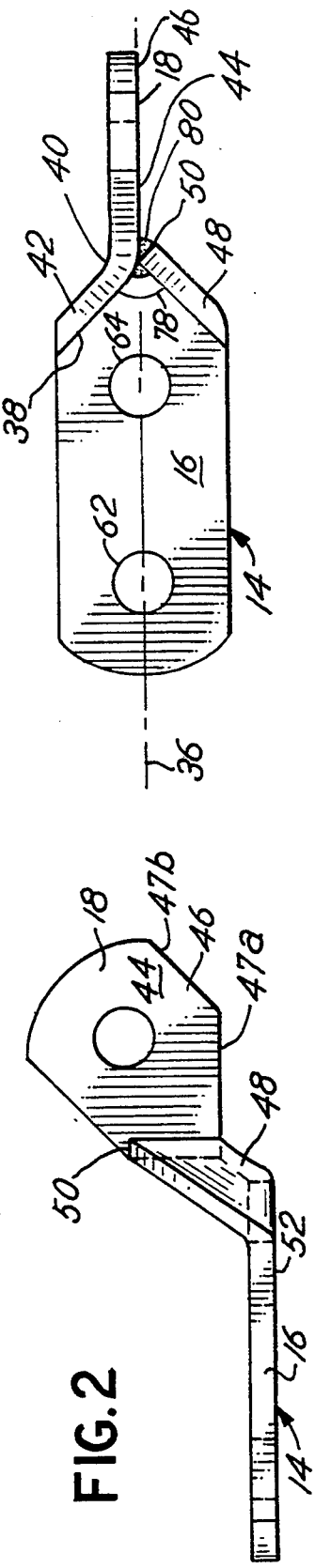

HINGE CONNECTOR

BACKGROUND OF THE INVENTION

The invention relates generally to a connector for joining structural members, and more particularly to a hinge connector enabling structural members to be joined at various angular orientations relative to one another.

A particular example of an application to which the invention relates concerns structures for supporting horizontally-extending pipe or conduit. One prior art support structure for such applications employs a plurality of prefabricated structural members comprising pairs of vertical members for suspending the support structure from an overhead beam or other structure, and horizontal channel members extending between the lower ends of each pair of vertical members. Pipes or conduits are clamped side-by-side to the upper surfaces of the horizontal channel members for support thereby. The pairs of vertical members and associated horizontal channel members are spaced at appropriate intervals to provide adequate support without unacceptably high stress on the structural components.

The rectangular geometry of this type of system has made such systems susceptible to swaying and consequent stresses of unacceptably great magnitude during seismic disturbances. Accordingly, support systems for use in areas at risk for seismic disturbances now may include diagonal braces extending obliquely upward from the ends of the horizontal members to an overhead beam or other structure.

There is a need for a connector to permit attachment of diagonal braces to adjacent structural members at various angular orientations, to enable prefabricated structural components to be assembled on-site in various configurations dictated by the varying spatial and strength requirements of particular applications.

It is an object of the invention to provide such a connector which may be manufactured inexpensively and which provides low deformation and relatively high strength commensurate with the strength of associated structural components.

SUMMARY OF THE INVENTION

In accordance with the invention, there is provided a hinged connector for joining a first structural member to a second structural member in a support structure, comprising first and second metal connector members, each having a base portion for attachment to a structural member, and a tab integral with the base portion, wherein each of the base portions includes an integral upset gusset for adding stiffness to the respective connector member and for adding support to the respective tab thereof. The first and second connector members are pivotally joined by a suitable fastener. Each of the tabs is noncoplanar with its associated base portion, and is preferably perpendicular thereto. Each tab preferably comprises an oblique portion and a longitudinal portion. In the preferred embodiment, the gusset is welded to the tab.

Further aspects of the invention will be apparent when the description and claims set forth below are considered in conjunction with the accompanying drawings.

BRIEF DESCRIPTION OF DRAWINGS

FIG. 1 is an elevational view of a support structure including hinge connectors in accordance with the invention.

FIG. 2 is a side elevational view of a connector member in accordance with the invention;

FIG. 3 is a plan view of the connector member of FIG. 2.

FIGS. 5-7 illustrate a method of forming a blank into a connector member of the type illustrated in FIGS. 2 and 3, wherein FIG. 5 is a plan view of a blank, FIG. 6 is a perspective view of the blank after it has been partially formed into the connector member, and FIG. 7 is a perspective view of the fully formed connector member.

DETAILED DESCRIPTION OF PREFERRED EMBODIMENTS

The invention is generally embodied in a hinge connector 10 for joining structural members. The connector may be used, for example, to join structural members such as horizontal channel-shaped pipe/conduit supports, diagonal braces or struts, or threaded rods to one another, or to other structural members such as overhead beams, vertical support columns, or walls made of steel plate, concrete, or other materials. As illustrated in FIG. 1, the connector may form part of a structure 12 for supporting pipe and/or conduit 90. However, the connector may also be useful in various other applications for joining structural members.

Figure 4:
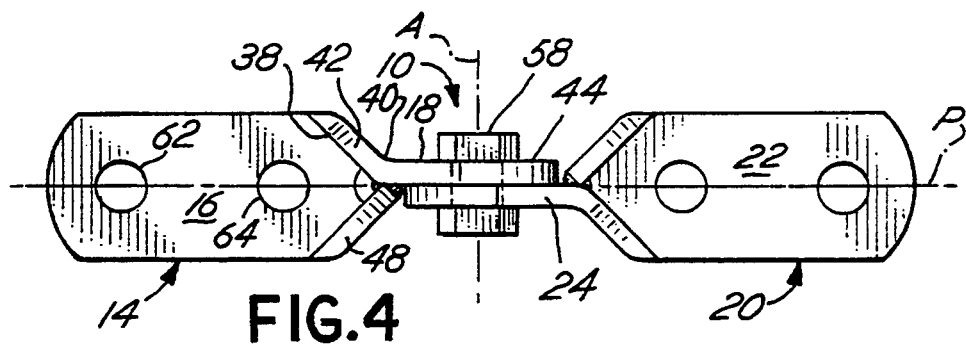
FIG. 4 is a plan view of a hinge connector comprising a pair of connector members of the type illustrated in FIGS. 2 and 3.

Each of the connectors illustrated in FIG. 1 comprises a first connector member 14 having a base portion 16 and a tab 18, and a second connector member 20 having a base portion 22 and a tab 24. The tabs 18 and 24 of each connector 10 are joined by a pivotal fastener 58. The illustrated connectors enable structural members to be connected to one another at any angle within a range of motion of over 270 degrees for each connector around rotational axis A (FIG. 4).

In the embodiment of FIG. 1, the support structure 12 comprises a pair of a vertical threaded rods 32, a horizontal support member 26 supported at the lower ends of the rods 32, and a plurality of diagonal struts or brace members 28 of channel-shaped cross section. The struts or braces 28 of the illustrated support structure provide stiffness to resist seismic disturbances.

The illustrated structure 12 is shown supporting a length of pipe or conduit 90 in a generally horizontal orientation. The pipe or conduit 90 is secured to the upper surface of the substantially horizontal channel-shaped member 26. The horizontal member is suspended from an overhead beam or ceiling structure 54 by a pair of threaded rods 32, each having a stiffener 56 of conventional design if necessary.

The struts or braces 28 extend diagonally upward from the ends of the horizontal member 26. Each of the diagonally extending struts or braces 28 is secured at its lower end to the horizontal member by a connector 10. Each of the diagonal struts or braces also has a connector 10 at its upper end for attachment to overhead support structure.

Each of the channel-shaped members 26 and 28 is of conventional configuration, comprising a web 30 having a pair of substantially parallel flanges or sides 34 extending perpendicular thereto and parallel to one another. Opposite the web (shown at the bottom of each member in FIG. 1), each of the sides turns inward and downward through a 180 degree bend to define a slot between the inwardly-turned upper portions of the sides 34. The connectors 10 are fastened to the members 26 and 28 by screws 86 engaging special channel nuts 88 within the respective channel-shaped members, with the shafts of the screws 86 extending through the respective slots.

A hinge connector 10 and its manufacture are described below in detail for purposes of example, with reference to FIGS. 2–8. For convenience of description, the connector member and its base portion will be described herein with reference to a common longitudinal axis, which is indicated at 36.

In each connector member 14, the tab 18 extends upward from the base portion 16 at a 90 degree bend 38 about an axis which intersects the longitudinal axis of the connector member at a certain angle, preferably 45 degrees. The tab 18 includes a bend 40 about a vertical axis, and comprises an oblique portion 42 adjacent the base and a longitudinal portion 44 which extends longitudinally beyond the base portion 16. To enable two connector members to be joined with their longitudinal axes in the same structural plane P (FIG. 4), the longitudinal portion 44 of the tab is slightly off-center, having an inner face 46 substantially coplanar with the longitudinal axis 36.

To facilitate orientation of structural members at predetermined angular relationships relative to one another, the tabs 18 of the connector members may be configured to provide visual indications thereon as to angular orientation. For example, in the illustrated embodiment, to facilitate 45 degree alignment of structural members for bracing applications as shown in FIG. 1, the tab 18 has a horizontal first lower edge portion 47a which intersects a second lower edge portion 47b, which is inclined at 45 degrees to the horizontal. In the illustrated connector 10, visual indication of the desired angular orientation is provided by the first edge portion 47a of each connector member being substantially aligned with the adjacent second edge portion 47b of the opposite connector member. This geometry also facilitates positioning of the connector members at right angles to each other. To orient the connector members at 90 degrees relative to one another, the inclined lower edge portions 47b of the respective opposite connector members are aligned with one another. In other embodiments of the invention, the lower edge portions of the tab 18 may be configured differently to facilitate orientation of the respective connector members at other angles relative to one another.

To stiffen the connector member 14 and provide support for the tab 18, an upset gusset 48 engages the tab 18 at the vertical bend 40 and is welded therealong. The gusset 48 is integral with the base portion 16 of the connector member, and extends upward therefrom, preferably being bent upward at a 90 degree angle about an axis which intersects the longitudinal axis of the base portion at a certain angle, preferably 45 degrees. The gusset 48 is opposite and generally coextensive with the oblique portion 42 of the tab. The gusset 48 has a vertical inner edge 50 adjacent the tab, and is welded on one or both sides of the joint between the edge 50 of the gusset and the adjacent bend 40 of the tab.

The tab 18 does not cross the plane of the bottom surface 52 of the base portion 16. This avoids interference between the tab 18 and the surface to which the connector is attached, particularly in applications where the connector is attached to a large flat surface.

In the embodiment illustrated in FIGS. 2–8, the base portion of each connector member has a pair of holes 62 and 64 centered on the longitudinal axis of the connector member to facilitate attachment of the connector member to structural members such as channel-shaped members 26 and 28.

Figure 6:
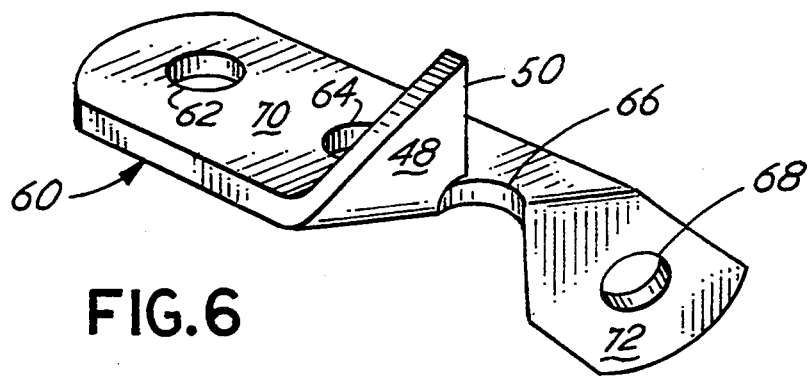
Figure 7:
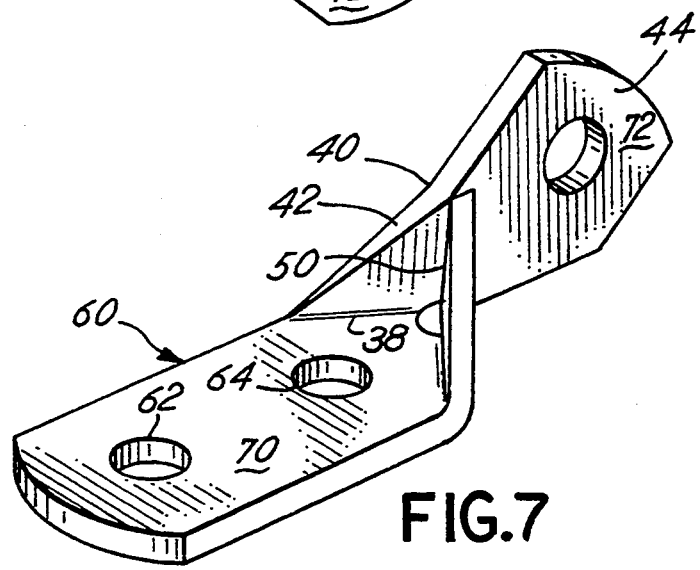
Figure 10:
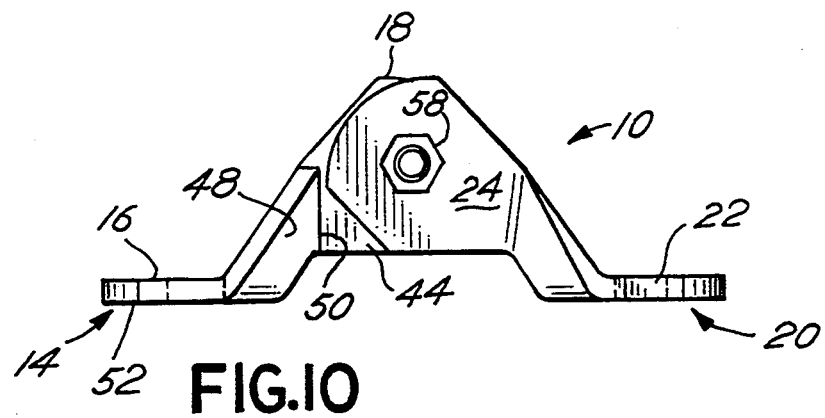
FIG. 10 is a side elevational view of a connector member in accordance with a third embodiment of the invention.
Figure 9:
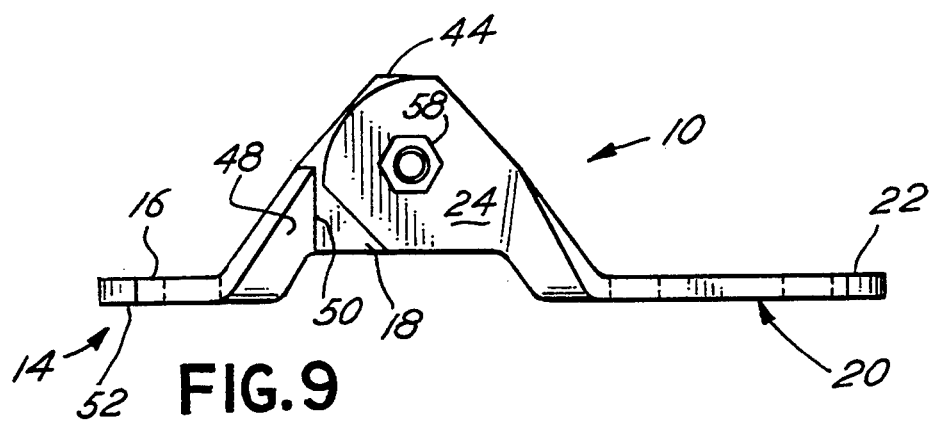
FIG. 9 is a side elevational view of a connector member in accordance with a second embodiment of the invention.
Figure 8:
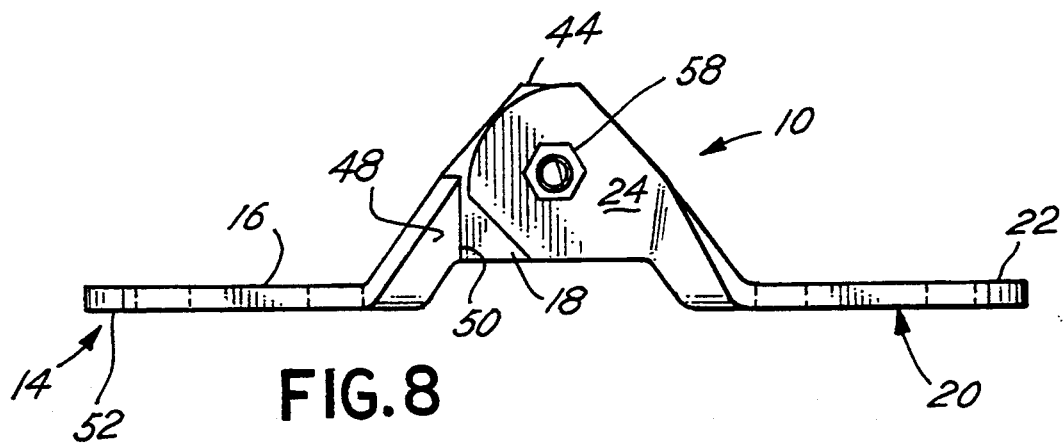
FIG. 8 is a side elevational view of the hinge connector of FIG. 4.

FIGS. 9 and 10 show side elevational views of hinge connectors substantially the same as that of FIGS. 2–8 except that, in the embodiment of FIG. 9, one of the connector members has a shorter base portion than the connector members of FIG. 8, and has only a single hole formed therein; and in the embodiment of FIG. 10, both connector members have shorter base portions, with only a single hole in each. The connector members are otherwise similar to those of FIG. 8, and similar parts thereof are described by the same reference numerals as used in FIG. 8. In other embodiments, the base portions could be of various other dimensions not shown or described herein, with other numbers of holes formed therein.

The first and second connector members are preferably joined, as illustrated, by a pivotal fastener 38 which may be adjusted to selectively control pivoting of the respective connector members 14 and 20 relative to one another. The fastener 58 may comprise a nut and bolt which may be tightened to secure the connector members in a desired position relative to one another, or may be loosened during adjustment of the connector members.

The fasteners in accordance with the invention are made of materials having strength characteristics preferably higher than those of the struts or other structural members associated therewith. While steel is a particularly preferred material, it should be appreciated that the connector member might alternatively be made of aluminum, stainless steel, or another material to suit the particular needs of a specific application.

In a preferred method of manufacturing the illustrated fasteners, a blank 60 (FIG. 5) is first punched from a ¼ inch strip of steel to provide an elongated blank having longitudinally aligned holes extending along the center thereof. The sides 82 of the illustrated blank are linear and substantially parallel to its longitudinal axis 36, while the ends 84 are rounded. The blank has a first portion 70 which will comprise the base portion of the finished connector member, and a second portion 72 which will comprise the tab portion of the finished connector member. The first portion 70 has a pair of substantially circular holes 62, 64 formed therein for attachment of the base portion to a structural member. The second portion 72 has a substantially circular hole in similar diameter, also located on the longitudinal axis of the blank, to enable interconnection of the fastener members to one another in the finished connector. Between holes 64 and 68 is formed a third hole 66. The third hole 66 is also generally circular, but is interrupted by a slot extending toward the side of the blank at a certain angle, preferably 45 degrees to the longitudinal axis 36.

Figure 5:
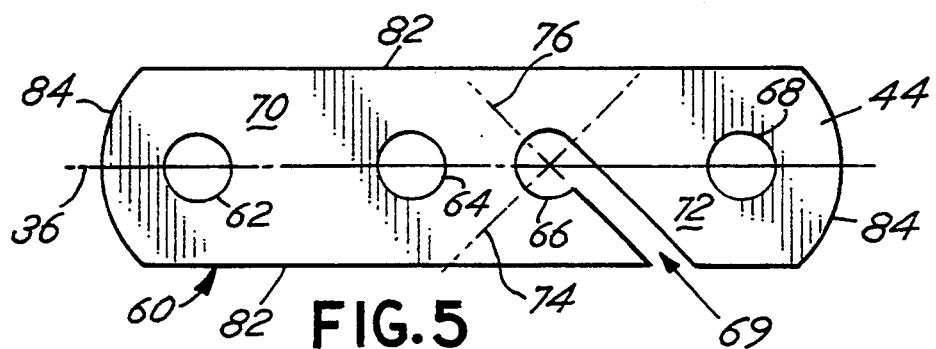

As shown in FIGS. 5-7, one method of forming the blank into the connector member comprises first bending the gusset 48 upward to perpendicular about axis 74 while bending the end of the tab portion 72 down at a 45° angle about the same axis 74, and subsequently bending the entire tab portion upward to perpendicular about axis 76. Each of the axes 74 and 76 intersects the longitudinal axis of the blank at an angle of less than 90 degrees, preferably about 45 degrees as illustrated. In the illustrated embodiment, the axes 74 and 76 are substantially perpendicular to one another. The net effect of the bending steps described above is to twist the longitudinal portion 44 of the tab 18 90 degrees relative to the base portion.

In the finished connector member 14, the vertical edge 50 of the gusset is disposed in contact with or closely adjacent the vertical bend 40 in the tab, and is welded thereto on one or both sides as shown at 78 and 80. The welded joint contributes strength to the finished connector member, and enables the gusset to add stiffness to the connector member and add support to the tab. The weld is approximately centered on the axis of hole 66 in the finished member 14.

From the foregoing, it should be appreciated that the invention provides an easily installed connector which provides an adjustable, high strength rigid joint between two structural members. The connector may be installed, for example, by first attaching the first and second connector members to respective structural members to be joined, then fastening the first and second connector members to one another, or alternatively by first joining the first and second connector members to one another, and subsequently attaching them to their respective associated structural members. If desired, several structural members and their associated connectors can be assembled in one configuration, then adjusted to their desired angular orientations. A structure may be preassembled with the fasteners between the first and second connector members at each joint tightened, to maintain the structure in a desired configuration prior to its attachment to an overhead support or other structure.

It should be appreciated that the connector members may be formed by methods different from the method described above. For example, the steps described above with reference to FIGS. 5-7 could be performed in a different order, or could be performed simultaneously.

The preferred embodiments of the invention described above should be viewed as illustrative, and are not intended to be limiting.

What is claimed is:

1. A structure for supporting pipe or conduit in regions subject to seismic disturbance, comprising a plurality of structural members and a plurality of hinged connectors for joining respective ones of said structural members to one another, each connector comprising:

first and second metal connectors members each comprising a base portion for attachment to a structural member, and a tab integral with said base portion;

each said tab comprising an oblique portion adjoining its associated base portion and a longitudinal portion which extends longitudinally beyond its associated base portion, each said longitudinal portion having an opening therein; and a pivotal fastener extending through said openings and joining said tabs;

each of said base portions including an integral bent gusset welded to its associated tab for adding support to its associated tab;

each of said connector members being capable of being manufactured from a single integral strip of metal.

2. A structure in accordance with claim 1 wherein said base portion has a flat bottom surface defining a base plane, and said tab does not intersect said base plane.

3. A structure in accordance with claim 1 wherein at least one of said gussets is welded to its associated tab.

4. A structure in accordance with claim 1 wherein each of said gussets has an edge extending adjacent its associated tab, and wherein said gusset is welded to said associated tab along said edge.

5. A hinged connector for joining a first structural member to a second structural member in a support structure for supporting pipe or conduit in regions subject to seismic disturbance, said connector comprising:

a first metal connector member comprising a base portion for attachment to a first structural member, and a tab integral with said base portion, said tab comprising an oblique portion adjoining said base portion and a longitudinal portion which extends longitudinally beyond said base portion, said longitudinal portion having an opening therein;

a second metal connector member comprising a base portion for attachment to a second structural member, and a tab integral with said base portion, said tab comprising an oblique portion adjoining said base portion and a longitudinal portion which extends longitudinally beyond said base portion, said longitudinal portion having an opening therein; and a fastener extending through said openings to join said tabs;

each of said tabs being noncoplanar with its associated base portion;

each of said base portions including an integral bent gusset for adding support to the tab integral with said base portion;

each of said gussets being welded to its associated tab along an edge of said gusset;

each of said connector members being capable of being manufactured from a single integral strip of metal.

6. A hinged connector in accordance with claim 5 wherein said fastener is adjustable between a first position enabling said fastener members to pivot relative to one another, and a second position securing said fastener members in position relative to one another.

7. A hinged connector in accordance with claim 5 wherein said first and second connector members are substantially identical to one another.

8. A hinged connector in accordance with claim 5 wherein said first and second connector members are made of steel of approximately ¼ inch thickness.

9. In a system for enabling a first structural member and a second structural member to rotate in a structural plane around an axis of rotation perpendicular to said structural plane, an improved hinge comprising:

a first sheet of material formed to define a first connector comprising a first portion of said first sheet intersecting said structural plane and defining a first section located on a first side of said structural plane and a second section located on a second side of said structural plane, a second portion of said first sheet through which said axis of rotation passes, said second portion defining a first end and a second end located adjacent said structural plane on a first side of said structural plane, a third portion of said first sheet connecting said first end of said second portion with said first section of said first portion, and a fourth portion of said first sheet connecting said first end of said second portion with said second section of said first portion;

a second sheet of material formed to define a second connector comprising a first portion of said second sheet intersecting said structural plane and defining a first section located on the first side of said structural plane and a second section located on the second side of said structural plane, a second portion of said second sheet through which said axis of rotation passes, said second portion defining a first end and a second end located adjacent said structural plane on the second side of said structural plane, a third portion of said second sheet connecting said first end of said second portion with said first section of said first portion, and a fourth portion of said second sheet connecting said first end of said second portion with said second section of said first portion;

a first fastener located between said first section and said second section of said first portion of said first sheet for fastening said first portion of said first sheet to said first structural member;

a second fastener located between said first section and said second section of said first portion of said second sheet for fastening said first portion of said second sheet to said second structural member; and a third fastener rotatably connecting said second portion of said first sheet with said second portion of said second sheet so that said first and second connectors rotate around said axis of rotation.

10. Apparatus, as claimed in claim 9, wherein said first and second sheets are steel, wherein said fourth portion of said first sheet is joined to said first end of said second portion of said first sheet by welding and wherein said fourth portion of said second sheet is joined to said first end of said second portion of said second sheet by welding.

11. Apparatus, as claimed in claim 9, wherein the joinder of said third portion of said first sheet to said first section of said first portion of said first sheet defines a first line that forms a first predetermined angle with respect to said structural plane and wherein the joinder of said fourth portion of said first sheet to said second section of said first portion of said first sheet defines a second line that forms a second predetermined angle with respect to said structural plane wherein the values of the first and second predetermined angles are substantially equal.

12. Apparatus, as claimed in claim 11, wherein the joinder of said third portion of said second sheet to said first section of said first portion of said second sheet defines a third line that forms a third predetermined angle with respect to said structural plane and wherein the joinder of said fourth portion of said second sheet to said second section of said first portion of said second sheet defines a third line that forms a fourth predetermined angle with respect to said structural plane wherein the values of the third and fourth predetermined angles are substantially equal.

13. Apparatus, as claimed in claim 12, wherein the values of the first, second, third and fourth predetermined angles are substantially equal.

14. Apparatus, as claimed in claim 9, wherein said first portion of said first sheet defines a first plane and wherein the junction between the first end of said second portion of said first sheet and said third and fourth portions of said first sheet defines a first junction line that is substantially perpendicular to said first plane.

15. Apparatus, as claimed in claim 14, wherein said first portion of said second sheet defines a second plane and wherein the junction between the first end of said second portion of said second sheet and said third and fourth portions of said second sheet defines a second junction line that is substantially perpendicular to said second plane.

16. Apparatus, as claimed in claim 15, wherein said first junction line and said second junction line lie substantially in said structural plane.

17. Apparatus, as claimed in claim 16, wherein said second portion of said first sheet is displaced from said first plane and wherein said second portion of said second sheet is displaced from said second plane.

* * * * *